(12) United States Patent
Taylor

(10) Patent No.: US 7,243,781 B2
(45) Date of Patent: Jul. 17, 2007

(54) CONVEYOR LOADING ZONE SYSTEM AND METHOD

(75) Inventor: Bryan Dale Taylor, Bono, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 0 days.

(21) Appl. No.: 11/158,871

(22) Filed: Jun. 22, 2005

(65) Prior Publication Data

US 2006/0289279 A1 Dec. 28, 2006

(51) Int. Cl.
*B65G 13/06* (2006.01)

(52) U.S. Cl. .................................. 198/783; 198/781.05

(58) Field of Classification Search ........... 198/781.01, 198/781.05, 781.06, 783
See application file for complete search history.

(56) References Cited

U.S. PATENT DOCUMENTS

| | | | |
|---|---|---|---|
| 4,088,224 A * | 5/1978 | Kittredge | ..................... 198/783 |
| 4,453,627 A | 6/1984 | Wilkins | |
| 4,488,638 A | 12/1984 | Morgan et al. | |
| 4,562,920 A | 1/1986 | Jaffre | |
| 4,798,282 A | 1/1989 | Sperduti et al. | |
| 5,060,785 A | 10/1991 | Garrity | |
| 5,086,910 A | 2/1992 | Terpstra | |
| 5,285,887 A | 2/1994 | Hall | |
| 5,318,167 A | 6/1994 | Bronson et al. | |
| 5,358,097 A | 10/1994 | Bakkila et al. | |
| 5,730,274 A | 3/1998 | Loomer | |
| 5,862,907 A | 1/1999 | Taylor | |
| 5,904,239 A | 5/1999 | Narisawa | |
| 6,035,999 A | 3/2000 | Hall | |
| 6,193,054 B1 * | 2/2001 | Henson et al. | ............... 198/783 |
| 6,315,104 B1 * | 11/2001 | Ebert | ..................... 198/781.06 |
| 6,460,683 B1 | 10/2002 | Pfeiffer | |
| 6,843,362 B2 * | 1/2005 | Tachibana et al. | ..... 198/781.05 |
| 6,860,381 B2 | 3/2005 | Newsom et al. | |

* cited by examiner

*Primary Examiner*—James R. Bidwell
(74) *Attorney, Agent, or Firm*—Alston & Bird LLP

(57) ABSTRACT

A conveyor system that includes a zoned conveyor surface and a loading sensor. The loading sensor is configured to detect placement of a load into the zone. A loading timer is activated by loading detection by the sensor and while activated, a controller system halts movement of the zone. This stops movement of the zone, facilitating placement of the load in the zone. Also, a sensor blocked signal may be sent to the upstream zone to stop movement of any loads in the upstream zone into the zone while loading. Normal movement in the upstream zone is handled by triggering a travel timer for a predetermined period of time, during which the loading timer is overridden so that the upstream load travels normally downstream.

22 Claims, 14 Drawing Sheets

Figure 5

| COMBINATION NUMBER | MODULE SENSOR STATE | DOWNSTREAM SENSOR STATE | ZONE STOP INPUT STATE | DOWNSTREAM ZONE OUTPUT STATE | MODULE ZONE OUTPUT STATE |
|---|---|---|---|---|---|
| 1 | CLEAR | CLEAR | OFF | N/A | RUN |
| 2 | BLOCKED | CLEAR | OFF | N/A | RUN |
| 3 | CLEAR | BLOCKED | OFF | N/A | RUN |
| 4 | BLOCKED | BLOCKED | OFF | N/A | STOP |
| 5 | CLEAR | CLEAR | ON | N/A | RUN |
| 6 | BLOCKED | CLEAR | ON | N/A | STOP |
| 7 | CLEAR | BLOCKED | ON | N/A | RUN |
| 8 | BLOCKED | BLOCKED | ON | N/A | STOP |

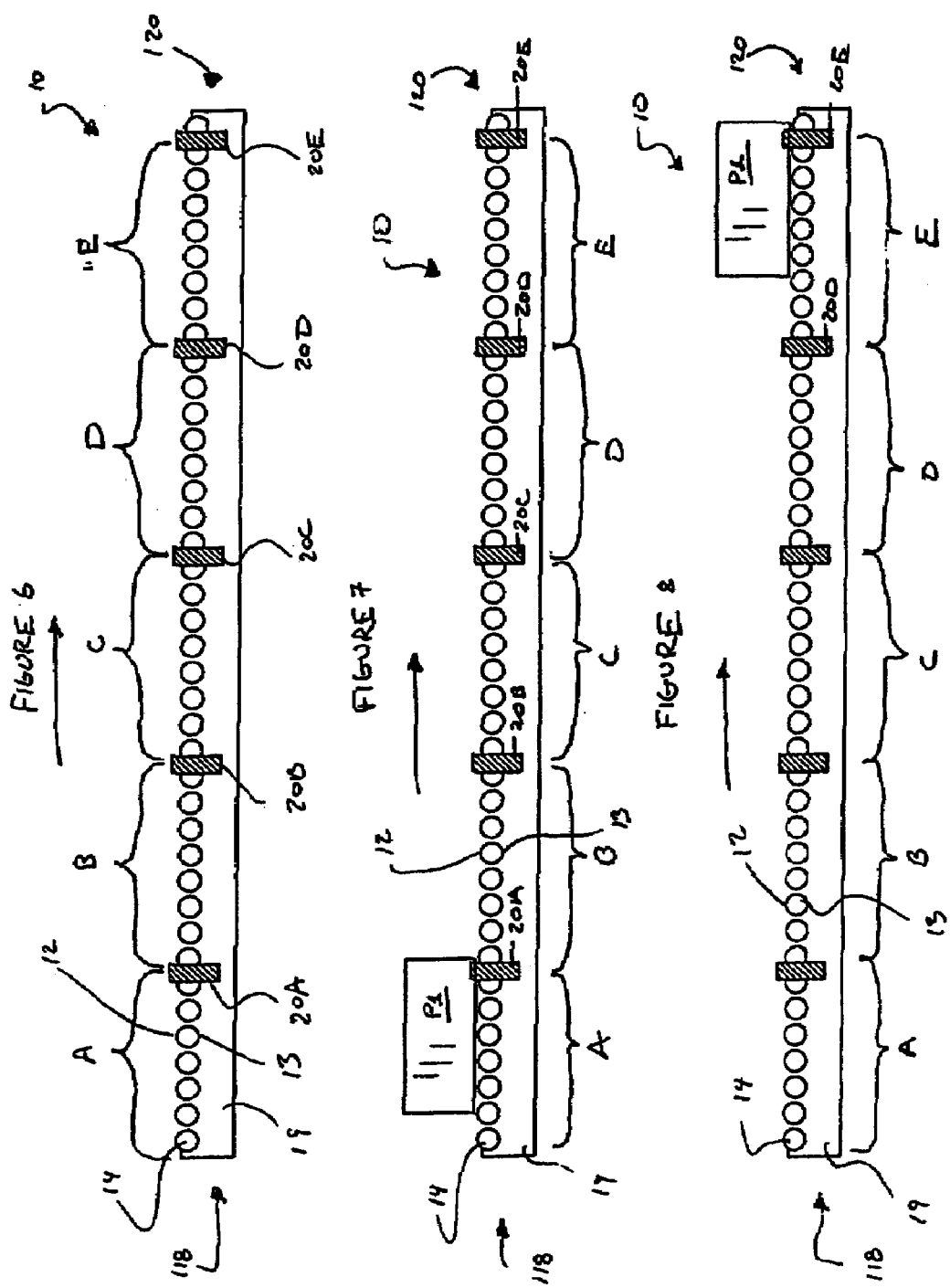

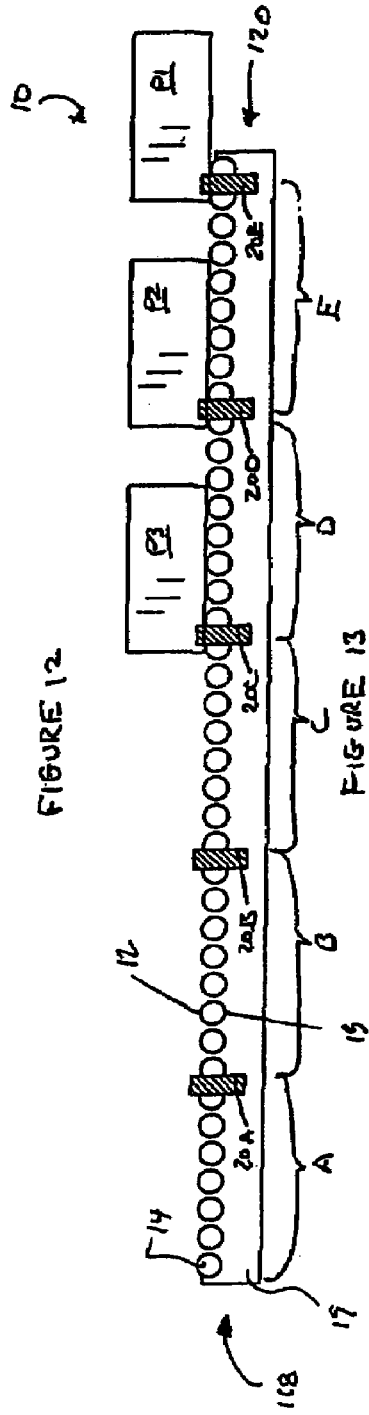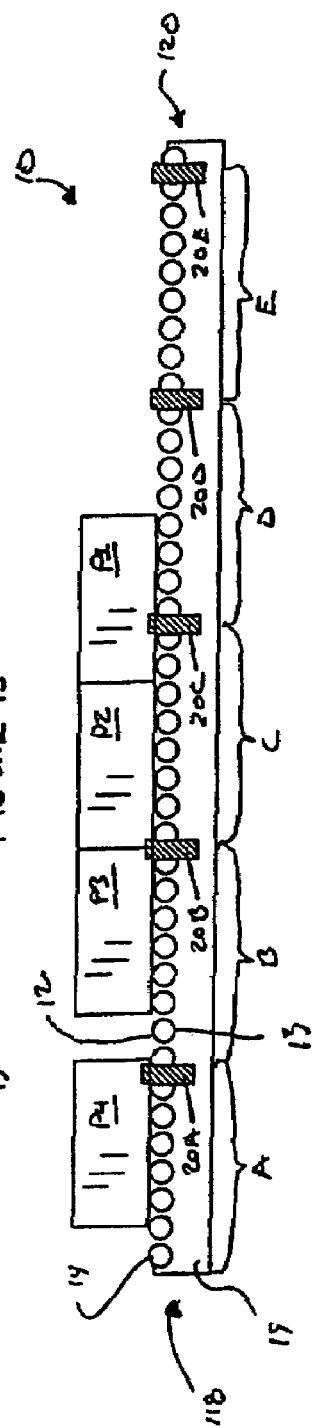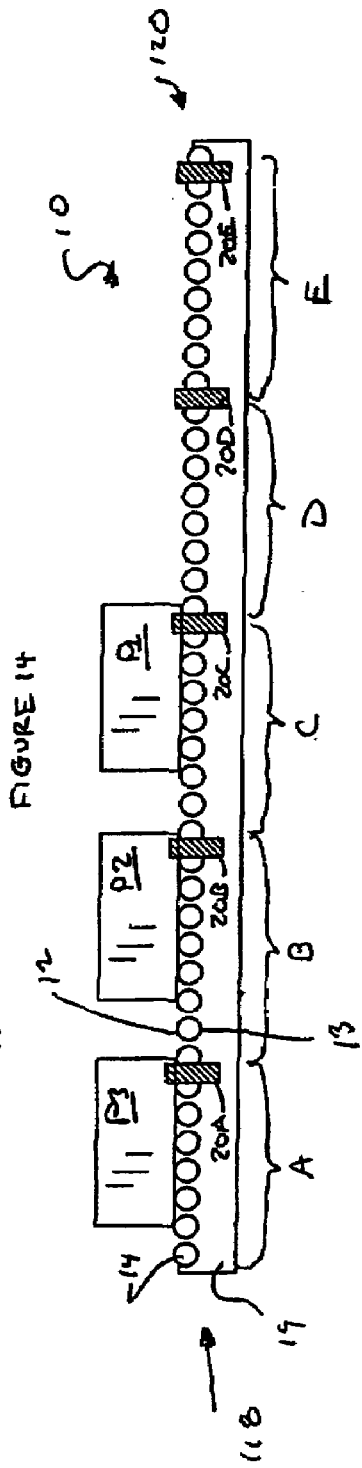

CONVEYOR LOADING ZONE SYSTEM AND METHOD

BACKGROUND OF THE INVENTION

1. Field of the Invention

The present invention is directed to conveyor systems, and more particularly to systems for facilitating loading of conveyors.

2. Description of Related Art

Conveyors are used to transport goods and packages in all types of environments and experience especially heavy use in manufacturing and shipping industries. In addition, characteristics of the flow of goods and packages along such conveyor systems, such as timing and positioning of the goods and packages, must often be tailored to the needs of the manufacturer or shipper. Accumulator conveyor systems are divided into zones in which a driving force may be selectively applied to a conveying surface which provides each package with a stopping position. As a result, packages or goods may be accumulated in successive zones for eventual discharge from the conveyor.

As an example, U.S. Pat. No. 5,862,907 to Taylor ("Taylor") discloses an accumulation conveyor 10 that is divided into a plurality of accumulating zones A, B, C, D and E, as shown in FIG. 1 of Taylor. The conveyor 10 includes a conveying surface, in this case a plurality of rollers 14, that are selectively driven under the control of a plurality of accumulation modules 20A-E that correspond to the accumulating zones. Each module 20 is capable of communication with its neighboring or adjacent module in the upstream and downstream directions through communications cables 42A-E. Photoelectric or ultrasonic sensors 28 are used to determine the presence or absence of an item or package within each of the accumulating zones. Thus, when a sensor fails to detect a package in a downstream zone, its module communicates with the upstream zone to activate its conveying surface and convey an object held therein to the downstream zone.

Despite improvements in the control systems of conveyors, conventional conveyors have other areas in which improvements are needed. For instance, when a driver places a package or load with a forklift on an infeed conveyor zone, a sensor at the downstream end of the zone detects the placement and wakes up the zone. The rollers of the zone then begin to turn as the load is lowered onto the conveying surface. This has the drawback of putting pressure on the sides of the forks of the forklift, making it difficult for the forklift to disengage from the load. In another scenario, the forklift is placing the load into an intermediate zone which adds the complication of possibly having an upstream load move into the intermediate zone.

One conventional way to avoid these problems is to apply a zone stop signal to the module that controls the loading zone and the upstream zone, if one is present. This requires the zone stop signal to be activated in some manner, such as through a photoelectric eye aimed horizontally across an approach path of the forklift. The zone stop 1) stops the rollers in the loading zone and 2) stops the upstream zone (if present) from conveying the load into the loading zone. Backing the forklift away from the conveyor unblocks the photoelectric sensor allows the conveyor to commence normal operation.

However, the photoelectrical eye must often be installed in several zones as an aftermarket assembly with external controls and wiring. This can be a complex and expensive undertaking.

Therefore, it would be advantageous to have a conveyor and loading zone system that provides for loading at multiple zones of the conveyor without extensive external controls and wiring. It would be further advantageous if the loading zone system were operable with a zero-pressure accumulation conveyor system.

BRIEF SUMMARY OF THE INVENTION

The above needs are met, and other advantages are achieved, by providing a conveyor system that includes a zoned conveyor surface and a loading sensor. The loading sensor is configured to detect placement of a load into the zone. A loading timer is activated by loading detection by the sensor and while activated, a controller system halts movement of the zone. This stops movement of the zone, facilitating placement of the load in the zone. Also, a sensor blocked signal may be sent to the upstream zone to stop movement of any loads in the upstream zone into the zone while loading. Normal movement in the upstream zone is handled by triggering a travel time for a predetermined period of time, during which the loading timer is overridden so that the upstream load travels normally downstream.

In one embodiment, the present invention includes a conveyor system for conveying a plurality of loads. The conveyor system includes a conveying surface configured to carry the loads in at least a downstream direction. The conveying surface is divided into a plurality of zones. A loading sensor of the conveyor system is associated with at least one of the plurality of zones and is configured to detect placement of one of the loads in the zone. Also included is a loading timer that is configured to be activated by the loading sensor when it detects placement of the load into the zone. The loading timer is configured to be activated for a predetermined time period thereafter. A controller system is configured to control movement of each of the zones of the conveyor independently and to halt movement of the zone in response to the loading timer being activated. Advantageously, this provides time for the load to be placed in the zone without the zone moving.

In another aspect, the conveyor system may also include a travel timer. The travel timer is configured to be activated by movement of one of the loads in an upstream one of the zones. It remains activated for a second predetermined time and the controller system is configured to deactivate the loading timer during this second predetermined period of time. This allows normally moving package to not be interrupted by loading until they are conveyed downstream.

Additionally, the loading sensor may be further configured to detect movement of the load along the conveying surface into the zone. In this instance, the controller is configured to continue conveying the load detected moving along the conveying surface while the travel timer is activated if the downstream zone is open.

In another aspect, the loading timer may restart after each blockage.

The controller system may be further configured to halt movement of an upstream one of the zones in response to the loading timer being activated. This stops loads from being conveyed into the zone while it is being loaded.

To ensure that loads are detected to activate the loading timer, the loading sensor may be placed between the upstream and downstream ends of the zone. Further, the loading sensor could be placed near the middle of the zone. Alternatively, the sensor could be placed at the downstream end of the zone.

In another aspect, a second loading sensor could be added to detect placement of the load in the zone. For example, the first loading sensor could be positioned near a downstream end, allowing it to sense, normally conveyed loads, and the second loading sensor positioned at an edge of the zone. The second sensor could sense the presence of loading equipment, such as a forklift, and trigger the loading timer.

In another embodiment, the present invention may include a sensing module for controlling the application of a drive force to a respective accumulating zone of an accumulation conveyor. Included in the sensing module are a body and a logic circuitry at least partially within the body. A sensor of the sensing module is coupled to the logic circuitry. The sensor provides a product sensed signal to the logic circuitry when a product is within its accumulating zone. Control connections are connected in communication with the logic circuitry. The control connections include an upstream product detect signal input adapted to receive a product detect signal downstream output from an upstream sensing module. A downstream product detect signal input is adapted to receive a product detect signal upstream output from a downstream sensing module. A product detect signal upstream output is adapted to transmit a product detect signal to an upstream module. A product detect signal downstream output is adapted to transmit a product detect signal to a downstream module. A drive/no drive force selection output is in communication with the drive force that selectively enables and disables the drive force for the respective accumulating zone. A loading timer is configured to be active for a predetermined period of time after activation. The logic circuitry is configured to activate the loading timer in response to the product sensed signal and to communicate the no drive force election output during the predetermined period of time.

The present invention has many advantages. For example, the use of the loading timer enables a delay that allows loading of packages into zones on the conveyor system. The use of additional sensors, such as the side sensor in an intermediate loading zone, or a repositioned sensor at the infeed end, facilitates detection of loading and triggering of the loading timer. Use of the travel timer, on the other hand, ensures that normally traveling packages are not interrupted by normal package tracking triggering of the loading timer. Overall, the conveyor loading system allows the conveyor to detect loading of packages and to halt the zone in which loading is occurring, and to stop downstream movement of packages upstream to avoid a collision during loading.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a chart of the control logic used in the conveyor system of FIG. 1;

FIG. 6 is a diagrammatic representation of an empty accumulating conveyor of another embodiment of the present invention wherein the conveyor has five zones;

FIG. 7 is a diagrammatic representation of the conveyor of FIG. 6 with a package P1 at an infeed end and in either a singulation or slug control modes;

FIG. 8 is a diagrammatic representation of the conveyor of FIG. 6 with the package P1 having traveled to a discharge end in either a singulation or slug control modes;

FIG. 12 is a diagrammatic representation of the conveyor of FIG. 9 wherein the packages are being released while the conveyor is in slug mode;

FIG. 13 is a diagrammatic representation of an accumulation conveyor with package P1 jammed and the other packages (P2, P3, P4) stacking up behind package P1 while the conveyor is in slug mode;

FIG. 14 is a diagrammatic representation of an accumulation conveyor illustrating use of a zone stop in accumulating zone C;

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

A zero-pressure accumulation conveyor 10 includes an upper (top) conveying surface 12 and a lower (bottom) surface 13 defined, in this case, by the tops and bottoms, respectively, of a plurality of rollers 14, as shown in FIG. 7. It should be noted, however, that other types of conveying surfaces, such as belts, slats, or modular plastic belts may be used. In the case of one type of belt conveying surface the upper portion of the belt is the conveying surface that supports objects being conveyed thereon and defines the upper conveying surface 12, while the lower surface 13 is defined by the lower portion of the belt on its return trip to the drive roll. The lower surface does not typically support packages or other objects for conveyance. In addition, the lower surface may be defined by the underside of a single layered moving belt or object that moves in the downstream direction and also defines the top conveying surface, but has no return portion.

The terms package, load, carton, object, etc., as used herein denote something carried by the conveyor 10 and in and of themselves should be considered interchangeable. Therefore, these terms should not be considered limiting to the invention.

The conveyor 10 is divided into a plurality of accumulating zones identified by the letters A, B and C such that there are three accumulating zones. The conveyor 10 has a direction of product flow over the upper conveying surface 12 which is arbitrarily chosen as from accumulating zone A towards accumulating zone C. Therefore, accumulating zone A is the first accumulating zone, generally known as the infeed end accumulating zone, while accumulating zone C is the last accumulating zone, generally known as the discharge end accumulating zone.

Figure 1:
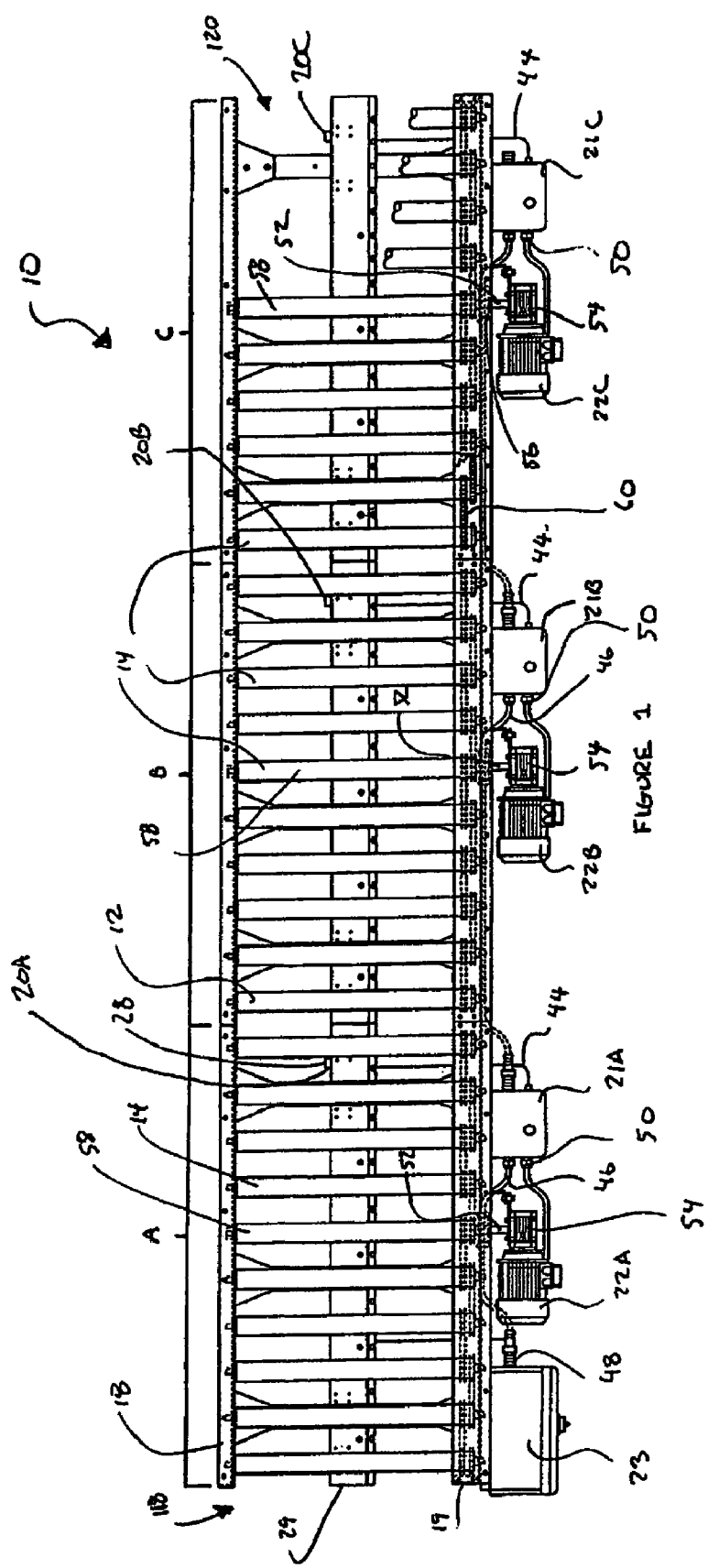
FIG. 1 is a top plan view of an accumulation conveyor system of one embodiment of the present invention wherein the conveyor has three zones.
Figure 2:
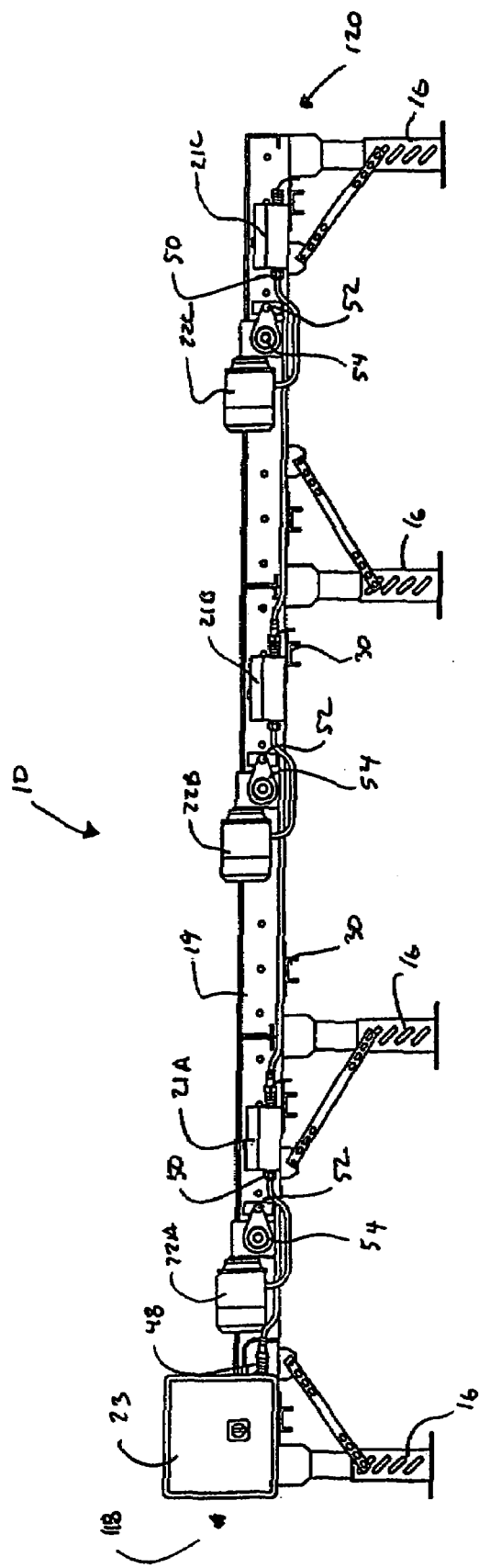
FIG. 2 is a side elevation view of the conveyor system of FIG. 1.
Figure 3:
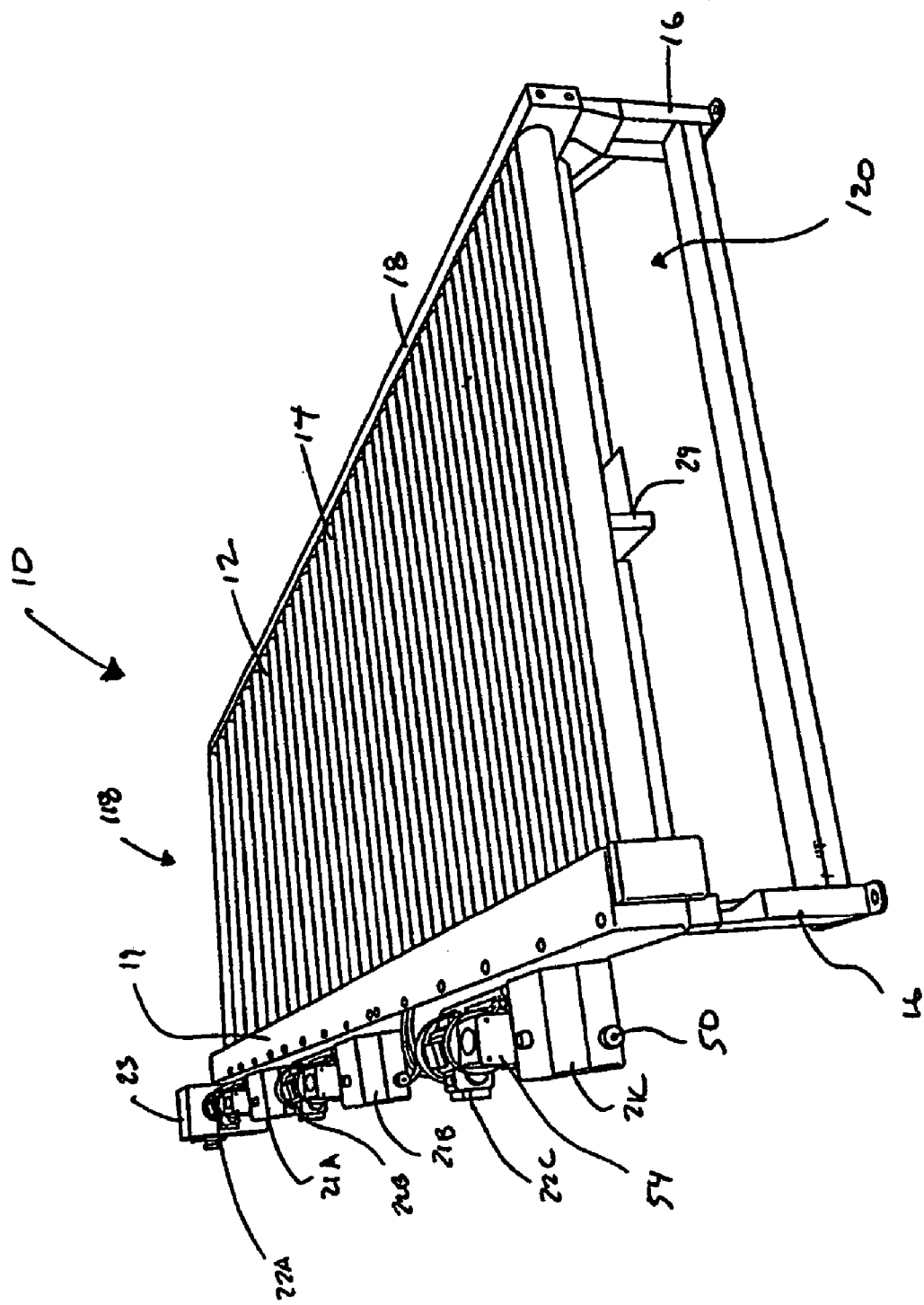
FIG. 3 is a plan view of the conveyor system of FIG. 1 as seen from its discharge end.
Figure 4:
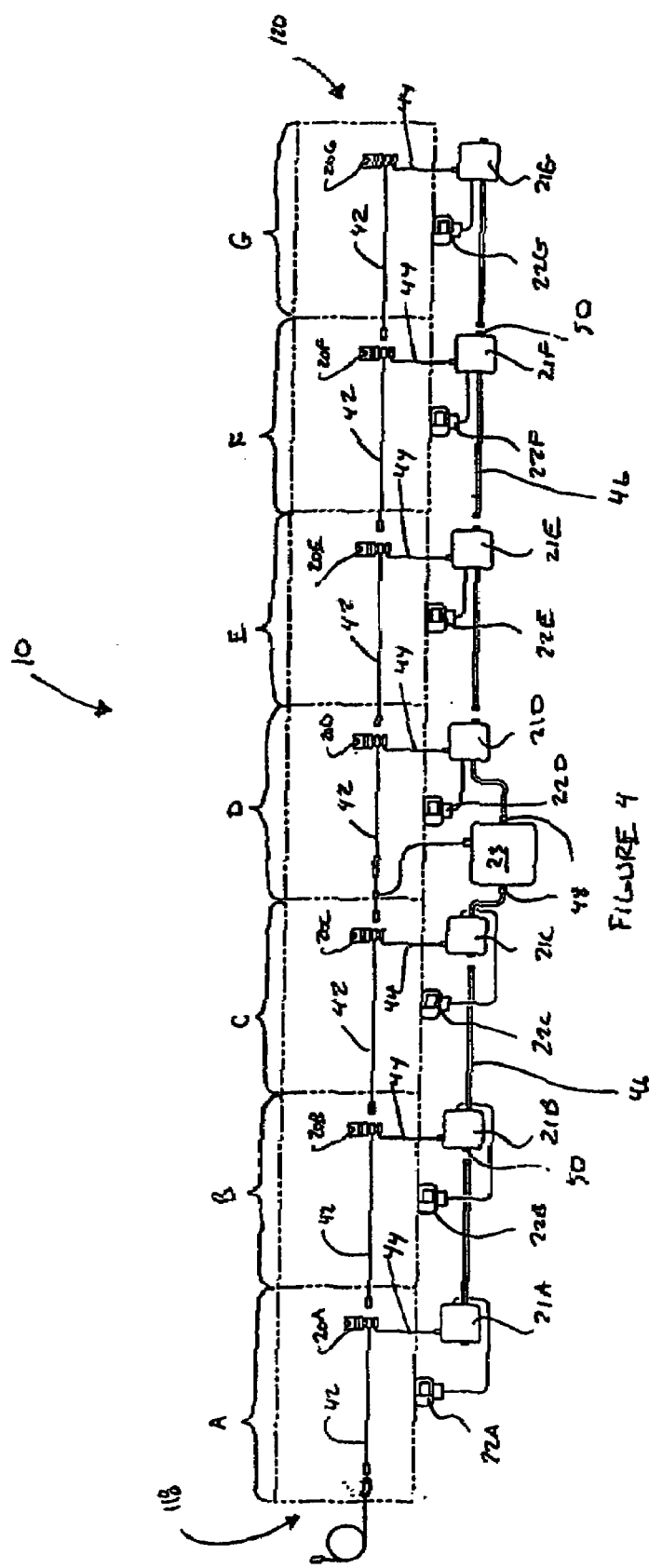
FIG. 4 is a schematic wiring diagram of a conveyor system of another embodiment of the present invention wherein the conveyor system has seven zones.

It should be noted that the number of zones illustrated in FIGS. 1-3 is arbitrary as there could be any number of accumulating zones depending upon the overall length of the particular conveyor or other conveyor design considerations. For instance, an alternative embodiment of the present invention illustrated in FIG. 4 shows a conveyor 10 having seven zones labeled A through G. As yet another example, embodiments of the present invention illustrated in the remaining FIGS. 6-14 show a conveyor 10 having five zones labeled A through E.

Referring again to FIGS. 1-3, the rollers 14 are rotatably supported between a first side rail 18 and a second side rail 19 which are in turn supported by legs 16. Positioned below the rollers 14 is a center rail 29 that extends between and parallel to the side rails 18, 19. The center rail 29 is supported in its position by a plurality of channels 30 fixed to the underside of the rails 18, 19 and extending therebetween in a cross-conveyor direction. Together, the side rails 18, 19, 29, channels 30 and legs 16 form a conveyor support frame.

The side rail 19 supports a plurality of zone controllers 21A, 21B and 21C and a plurality of drive motors 22A, 22B and 22C. Each controller is paired with an adjacent one of the drive motors, with each controller/drive motor pairing positioned in a respective one of the zones A-C, as is indicated by the reference numbers. Side rail 19 further supports a disconnect and power supply panel 23 which is positioned in the embodiment illustrated in FIGS. 1-3 in zone A. In the embodiment illustrated in FIG. 4, alternatively, the power supply panel 23 is in zone D. Center rail 29 supports a plurality of accumulation logic modules designated 20A, 20B and 20C and also corresponding to the accumulating zones A-C. As shown best by the embodiment illustrated in FIG. 4, each logic module 20 is supported beneath the rollers 14 in its respective one of the zones A-C at approximately the downstream end of the zone for reasons described more fully below.

Each logic module 20 includes a housing or casing 24 that encloses electrical logic circuitry that receives various input signals and transmits various output signals based on internal evaluations as per the exemplary chart in FIG. 5. The logic circuitry may include a microprocessor and other components, or may be another type of logic structure that will perform the functions described below.

Figure 15:
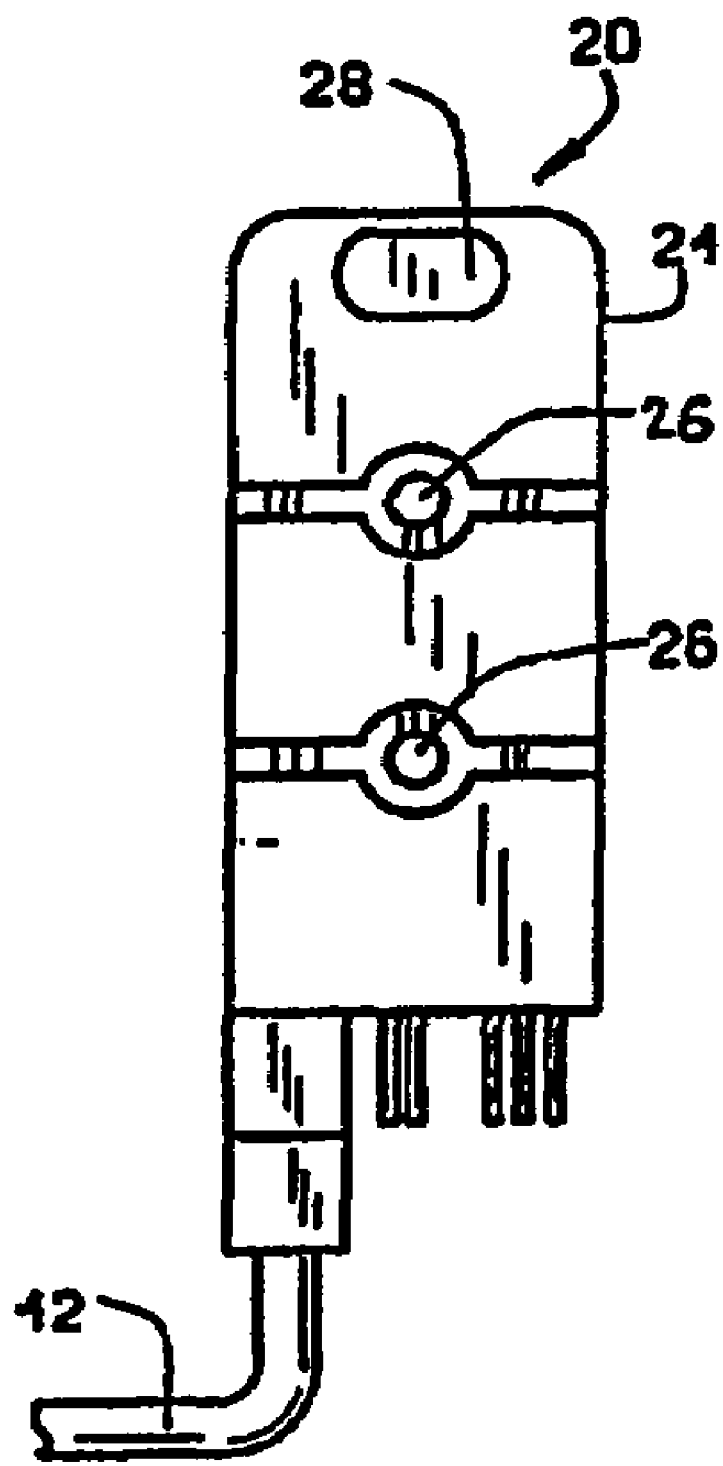
FIG. 15 is a control logic module of another embodiment of the present invention.
Figure 16:
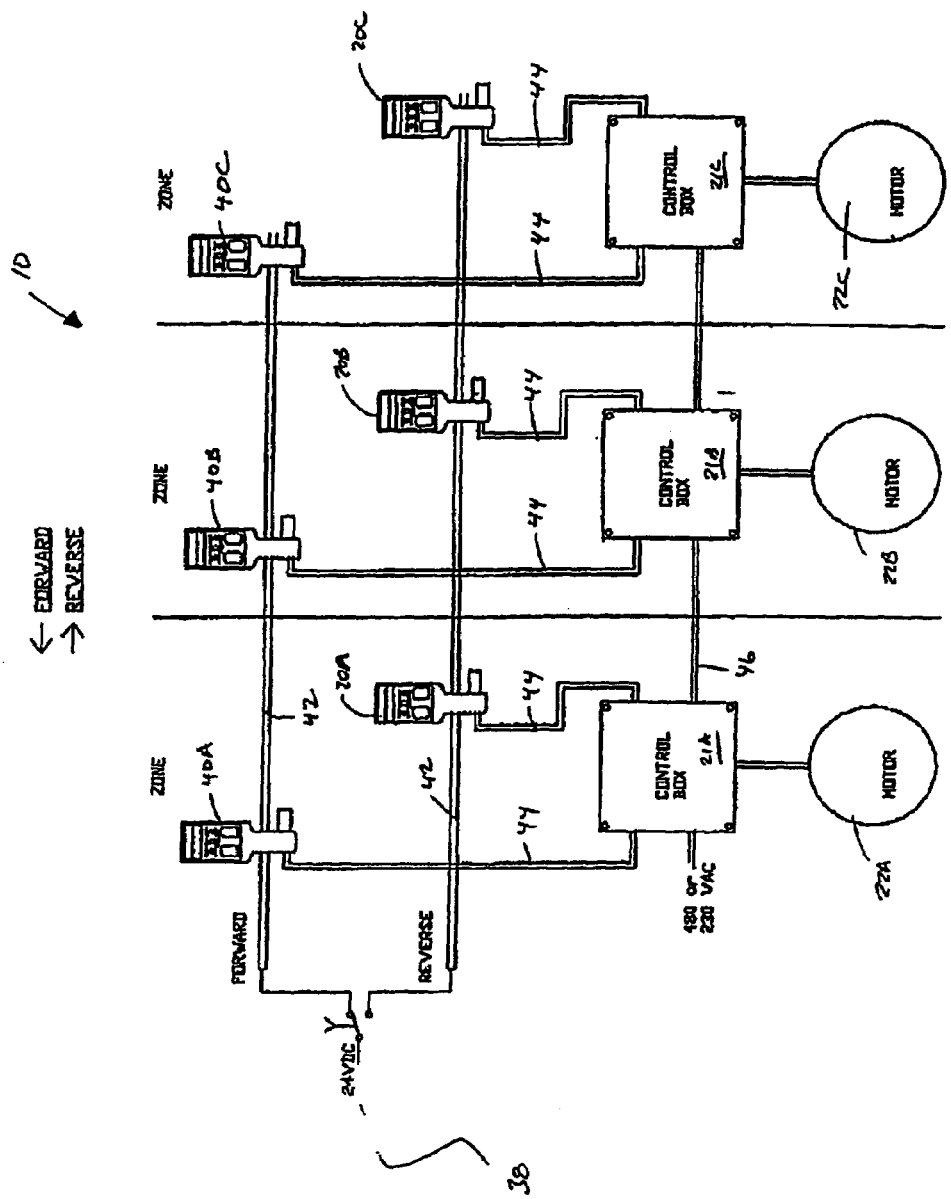
FIG. 16 is a schematic of several of the control logic modules of FIG. 15 connected to form a control system of another embodiment of the present invention.

The casing 24 of each module 20 includes a pair of bores 26 extending therethrough that allow the casing to be mounted to a center rail 29 underneath the rollers or conveying surface 12 of its respective one of the zones, as shown in FIGS. 1, 4 and 15. The center rail is aligned with, and positioned between, the side rails 18 and 19. Each module 20 further includes a sensor 28 on an upward face so that a field of view of the sensor extends between a pair of the rollers 14. Each sensor 28 is in communication with the logic circuitry of the module 20 in its respective zone and the modules in the upstream and downstream zones via the module communication lines 42.

The sensor 28 is used to determine the presence or absence of an item or package within the respective accumulating zone and to send a signal to its respective logic circuitry indicating the same. The sensor may be a photoelectric sensor, a proximity sensor, an ultrasonic sensor, or any other type of sensor that is capable of detecting the presence or absence of an item within the respective accumulating zone and providing a signal indicative of the same to the logic circuitry. Different types of sensors, and different types of conveying surfaces, may require different positioning of the sensors. For instance, each sensor 28 may be mounted on one of the side rails 18, 19 and have a field of view in the cross-conveyor direction. Such side mounting would be advantageous when belt conveying surfaces are used because the belt would otherwise block the view of a sensor mounted under the conveying belt surfaces.

Each logic module 20 is in communication with its neighboring or adjacent module, both in the upstream direction and the downstream direction relative to conveyor flow, where possible, through communications cables 42. Therefore, module 20B is in communication with upstream module 20A and downstream module 20C, as shown in FIG. 1 (only a portion of each module is visible due to the presence of the center rail 29). On the other hand, accumulating zone A is only in communication with its adjacent downstream module 20B, while accumulating zone C is only in communication with its adjacent upstream module 20B. Communication of the logic module 20 of the first and last zones would be the same for conveyors of other lengths, such as zone A in the seven-zone conveyor of FIG. 4 being only in communication with downstream zone B, and zone G being communication only with upstream zone F, while the intervening zones are each in communication with the logic module of both the upstream and downstream zones.

Each zone controller 21 has logic circuitry specific to controlling the operation of a respective one of the motors 22 in its zone. Each controller 21 includes a pair of power connections 50 on its upstream and downstream sides. Attached to the power connections 50 are power supply lines 46 that connect the controllers in a series ending in the power supply panel 23. Notably, the zone controller 21 at a discharge end 120 has an open power connection (zone C in the embodiment illustrated in FIG. 1) that allows the addition of further downstream zones for longer conveyors. In addition to being able to switch its respective motor 22 on and off, each zone controller 21 is further capable of varying the speed of each motor, such as by controlling the amount or frequency of power supplied to each motor. Such power control allows for a "soft start" wherein the motor, and hence conveying surface 12 speed, is gradually increased. Beyond soft starts, the overall speed of each motor 22 can be controlled to control throughput of conveyed objects (e.g., packages) and to further facilitate zero-pressure accumulation.

The power supply panel 23 may include one, or more, connections 48 for attachment of the corresponding number of power supply lines 46, allowing the panel to be positioned in any selected upstream (single output as shown in FIG. 1) or downstream position with controllers 21 in either, or both (dual output as shown in FIG. 4), the upstream and downstream directions. The power supply panel 23 is a 208/230 volt, 3 phase, 60 Hz power supply for 1-5 zones at single output, or 1-10 zones at dual output. The zone capacity may be doubled with a 460 volt, 3 phase, 60 Hz motor for 1-10 zones at single output, or 1-20 zones dual output. Despite the aforementioned preferences, the voltage rating, and other capabilities, of the power supply panel 23 can be changed to suit increased zone and load requirements of the conveyor and, in particular, increased capacity of the drive motors.

Each drive motor 22 could be 208, 230 or 460 volt, ½ horsepower motor that has a torque rating of at least 100 in-lb and preferably about 687 in-lb (for a conveyor load rating of 3,000 lb), or even higher depending upon the desired loads to be moved by the conveyor. Such motors have a life expectancy when used in the present system of about 100,000 hours which is advantageous for low-maintenance and downtime on conveyors that experience heavy use and move heavy loads. Each drive motor 22 also includes a drive shaft 52, and, if necessary, a gearbox or reducer 54 for reducing the output speed of the drive motor at the shaft 52. The reducer 54 illustrated in FIG. 1 also allows mounting of the motor at a right angle to the machine direction for a lower profile than a straight-mounted motor. Reducing the profile of the motor is advantageous due to the large size of the motors necessary to drive higher conveyor loads.

The conveyor system 10 of the present invention also has a drive assembly that includes a non-slip coupling 56 that connects the end of the motor shaft 52 to a driven roller 58 of the rollers 14. The remaining ones of the rollers are slaved to the driven roller 58 by a chain drive system wherein individual chain loops 60 extend about sprockets fixed to adjacent pairs of the slaved rollers. In this manner, driving of the driven roller 58 by the motor 22 also drives the remaining rollers 14 and causes objects supported on the rollers to move in the upstream or downstream direction. Of course, with the use of alternative conveying surfaces, chain drives may not be necessary, or optimal, such as with belt conveyors. In a belt conveyor, the driven roller drives a belt wrapped around a second, non-driven roller and the length of belt between the rollers defines the zone. Such an alternative conveying surface, however, would still benefit from the use of a non-slip coupling which has several advantages independent of the type of conveying surface.

Advantageously, unlike conventional drive systems, the conveyor 10 does not require extended chains, belts or shafts because power from a single motor need not be transmitted along the entire conveyor. In addition, the present conveyor system does not require the use of clutches to selectively transmit power to the different zones. A non-slip transmission system allows greater amounts of the power generated by the motor 22 in each of the zones to be transmitted to the conveying surface 12 (thereby increasing conveyor load capacity), reduces the noise associated with clutch engagement and eliminates the dust generated by clutch-driven systems. Particularly advantageous is a combination of the non-slip transmission with the soft-start, variable power control of the zone controllers 21A-C which replaces the hard start caused by relatively low slip clutches. Notably, non-slip is used herein to refer to connections in which no slip occurs, which excludes even low-slip clutches. Non-slip also excludes other apparatuses that experience slip during power transmission, such as fluid power transmissions.

Non-slip couplings and transmissions can include hard connections, wherein the drive shaft 52 of the motor 22/reducer 54 is coupled directly to the driven roller 58, such as by a collar or key and slot combination. Alternatively, a soft coupling, such as an elastic or flexible coupling, may be used that transmits power without slip, but facilitates a soft-start of the upper conveying surface 12. In addition, a combination of connections could be used to form a non-slip coupling or connection between the driven roller 58 to the drive shaft 52 if space constraints dictate that the motor be placed in an irregular position. For instance, the drive motors 22 could be placed beneath the lower conveying surface (i.e., below the plurality of rollers 14 in the illustrated embodiments) in each of the zones A-C so as to minimize the lateral profile of the conveyor 10. Of course, such a motor placement would limit the length of the legs 16 and inhibit conveyor configurations wherein the upper conveying surface 12 is very close to the floor.

The aggregation of accumulation modules 20A-C and controllers 21A-C of FIGS. 1-3 constitute an accumulation control device or system that works in conjunction with the drive motors 22 and associated non-slip drive couplings to control the flow of packages along the conveyor. In response to inputs from the logic circuitry of each module 20, each zone controller 21 is capable of switching its respective drive motor 22 on and off by controlling the power supplied to the drive motor. Therefore, each of the zones A-C may have its drive motor 22 individually controlled via input from its respective controller 21 and logic module 20. Optionally, the controller 21 and/or logic module 20 may be further configured to determine when the drive motor is experiencing overload and to shut off or reduce power to the motor 22.

It should be noted that although accumulation control is embodied in circuitry in separate modules and controllers in the illustrated embodiments, such circuitry could be combined in a single unit. Also, it should be noted that the modules and controllers could also be embodied in software, hardware, firmware, or combinations thereof and still execute accumulation control. However, the positioning and hardware circuitry of the embodiments illustrated (and other embodiments wherein the control logic and power control system for each zone is contained within the zone and easily connectable to upstream and downstream zones) herein are preferred for reasons of durability and the ease of adding additional zones, or combining zones, to increase the length of the conveyor system.

The logic circuitry flow of the various inputs and outputs of each module 20 is depicted in the aforementioned chart of FIG. 5. The chart of FIG. 5 illustrates the zone output (either RUN or STOP) of a module 20 based on the state of the subject zone's sensor 28, the sensor 28 of a downstream module 20, the subject zone's stop input state, and a downstream zone output state.

In combination one, when the subject module sensor 28 is CLEAR and the downstream module sensor 28 is also CLEAR, and the zone stop input is OFF, the subject module zone output state is RUN. A BLOCKED state of the subject module sensor 28 in combination two still results in a RUN for the module zone output state. So does a CLEAR state of the subject module sensor 28 and BLOCKED state of the downstream sensor 28 in combination three. Notably, combinations one, two and three depict uninhibited movement of a zone-sized or smaller package's movement with the subject zone input state OFF. The subject module is configured, however, to change its output state to STOP if the downstream sensor state is BLOCKED, as shown in combination four.

Combinations five, six, seven and eight illustrate zone outputs of the subject zone module 20 with the subject zone stop input state ON. Combination five shows the subject module sensor 28 as being CLEAR and the downstream sensor as being CLEAR, with the resultant output of the subject module zone output being RUN. In combination six, the subject module sensor 28 is BLOCKED and the downstream sensor state is CLEAR, the subject module zone output state is STOP. Thus, a package in the subject zone is stopped in response to the subject zone having the stop input state ON. In combination seven, the subject module sensor 28 is CLEAR and the resulting subject module zone output state is RUN, even with the downstream sensor is BLOCKED. Finally, with the subject module sensor 20 state being BLOCKED and the downstream module sensor 20 being BLOCKED, the subject module zone output state is STOP.

With reference now to FIGS. 6-14, operation of the accumulating conveyor 10 will be described relative to zone or smaller-sized packages entering the accumulating conveyor, being carried down the conveyor, and being discharged from the conveyor, when the control device is in the singulation mode, the slug mode, and the various features associated therewith. It should initially be understood that, 1) in FIGS. 6-9, the sequence of events are applicable to both the singulation mode and the slug mode; 2) in FIGS. 10 and 11, the sequence of events apply to the singulation mode only; 3) in FIGS. 12 and 13, the sequence of events are applicable to the slug mode only; and 4) in FIG. 14, the sequence of events applies to both the singulation and slug modes.

FIG. 6 depicts an empty accumulating conveyor 10 having five zones A-E with zone A at an infeed end 118 and zone E at the discharge end 120. The conveyor has no packages thereon and is thus empty. Zones B-E are sleeping (not running) assuming the sleep mode is enabled, indicating that there has not been any package for the set time period. Zone A however, is set to sleep mode disabled such that zone A is running in order to convey a package to the discharge of zone A and begin the "waking up" process. Zone E has its zone stop setting to active to cause the first package to reach zone E to be stopped therein. In FIG. 7, a package P1 has entered zone A. Upon detection of the package P1 in zone A by the module 20A, a product detect signal is sent to the adjacent downstream module 20B. Upon receipt of a product detect signal from the adjacent upstream module 20A, module 20B transmits a drive signal to its controller 21 to "wake up" the motor 22 and the zone. Thus, the package P1 is transported from zone A into zone B.

Referring to FIG. 8, the package P1 has been transported all the way to zone E, the discharge zone. Each adjacent module from module 20B, in other words modules 20C and 20D, have run through the same sequence as described between modules 20A and 20B. However, when the package P1 reaches zone E, module 20E being set to zone stop enable, transmits a no drive signal to its controller 21 and drive motor 22 to stop the drive force in zone E. The module 20E simultaneously sends a product detect signal to the adjacent upstream module 20D. Zones D and C are still in the zone running state as their sleep timers will not yet have expired, while zone B is in the sleep mode as its sleep timer will have expired.

Figure 9:
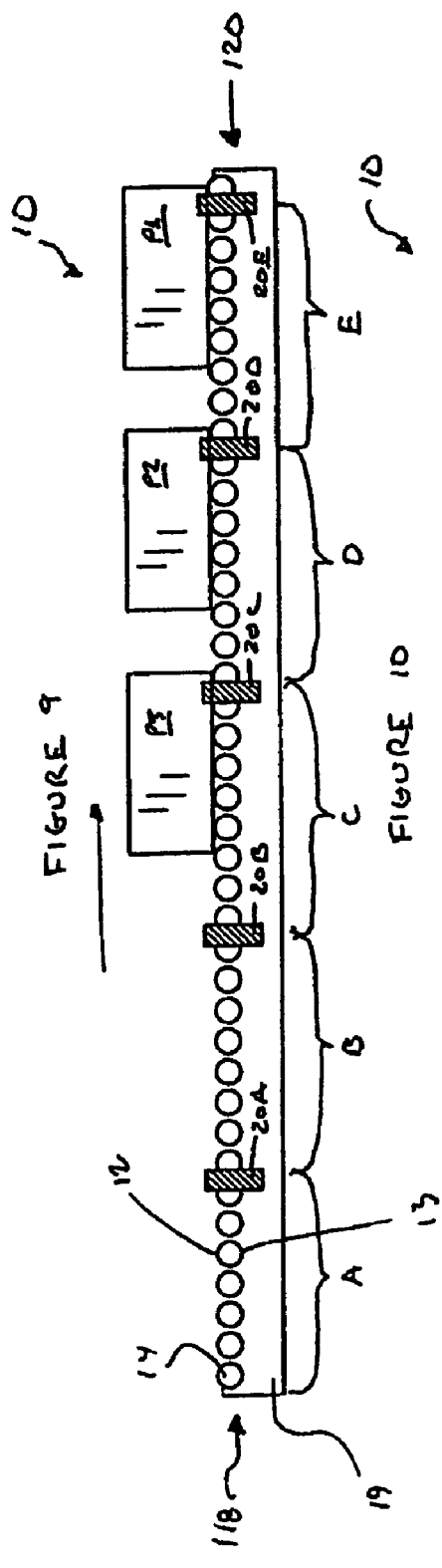
FIG. 9 is a diagrammatic representation of the conveyor of FIG. 6 wherein package P1 has been held at the discharge end and packages P2 and P3 have entered and traveled down the conveyor in either a singulation or slug control modes.

Assuming, that immediate discharge of package P1 from the conveyor 10 is not desired, FIG. 9 depicts the situation where two more packages P2, P3 have entered the conveyor. Package P2 travels down the conveyor as described above until it detected by module 20D. Since module 20D has already received a product detect signal from the adjacent downstream module 20E, the detection of the package P2 within its zone (zone D) will cause the module to transmit a no drive signal to stop its zone (again, zone D). Module 20D also sends a product detect signal to its adjacent upstream module 20C, and to its adjacent downstream module 20E. As package P3 travels down the conveyor 10 it is detected by module 20C. Since module 20C has already received a product detect signal from the adjacent downstream module 20D, the module 20C outputs a no drive signal to stop the zone, zone C. Module 20C also transmits a product detect signal to the adjacent upstream module 20B and to the adjacent downstream module 20D. Also, since no packages have entered the conveyor 10, zone B has gone to sleep.

Again, the sequence of events described above with reference to FIGS. 6-9 are applicable to both the singulation mode and the slug mode. If the zone E module 20E were not set to zone stop, the products would be discharged from the conveyor regardless of the mode, unless the products were too close together while in the singulation mode. In the singulation mode, the packages would momentarily stop within the zones to provide the proper spacing.

Figure 10:
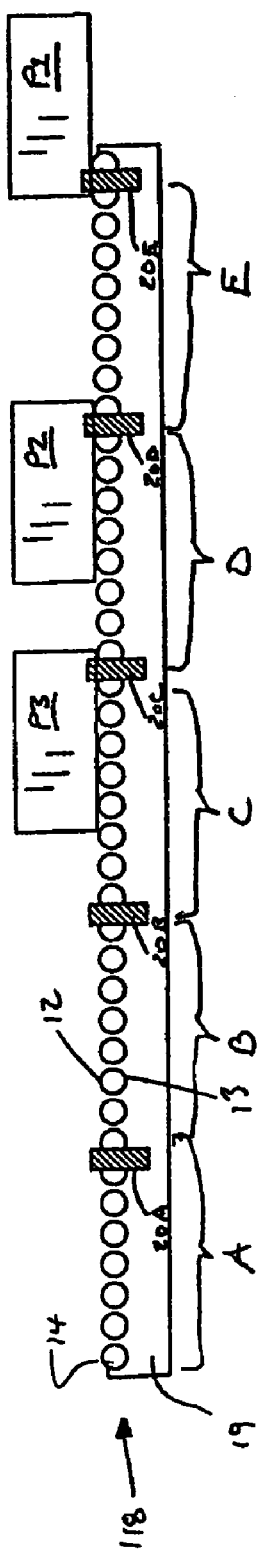
FIG. 10 is a diagrammatic representation of the conveyor of FIG. 9 wherein package P1 is being released with the control device set to singulation mode.
Figure 11:
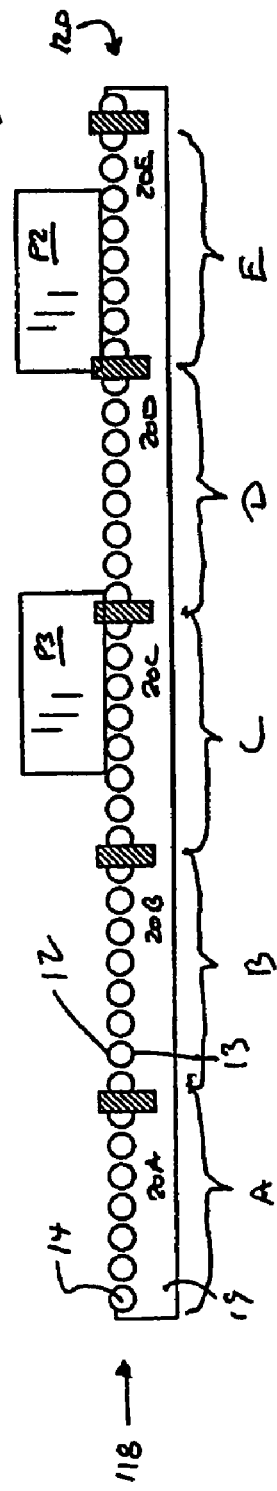
FIG. 11 is a diagrammatic representation of the conveyor of FIG. 10 releasing the package P2.

Referring to FIGS. 10 and 11, the discharge of packages from the conveyor will be described when the control device is set to the singulation mode. When it is desired to discharge the packages from the conveyor, the zone stop input to module 20E is disabled or set to inactive. This will cause the module 20E to send a drive signal to start the respective zone running since the module 20E will not be receiving a product detect signal from an adjacent downstream module in addition to the current product detect signal from its own sensor, because there is no downstream module. As the package travels along zone E, the module 20E will continue to send a product detect signal to the adjacent upstream module 20D until the entire package has cleared the module 20E.

Since module 20D is still receiving its own product detect signal and a downstream product detect signal, zone D remains stopped. This produces a gap between the packages approximately equal in length to the length of the zones, hence the term singulation. Once however, the package P1 has cleared the module 20E, the module 20E stops sending a product detect signal to the adjacent upstream module 20D causing the module 20D to send a drive signal to start the drive motor 22 for its zone, zone D. The package P2 continues to advance through zone D while zone C is still stopped since the zone D module 20D is still detecting a package. As the package P2 clears the module 20D, the product detect signal to the adjacent upstream module 20C ceases allowing the package P3 to begin its travel down the conveyor. The package P2 is discharged from the conveyor as explained above with reference to package P1, likewise with package P3.

FIG. 12 depicts the release of packages after accumulation in FIG. 9 when the conveyor is in the slug mode. The zone stop input to module 20E has been set to inactive causing module 20E to change zone E to a running state, in turn causing zone E to begin discharge of package P1. In contrast to the singulation sequence, module 20E will not immediately send a product detect signal to the adjacent upstream module 20D even though a package P1 is still being detected by the module 20E, but instead starts the jam timer. If package P1 is still being detected by module 20E after the jam timer has expired, the product detect signal is then sent to the adjacent upstream module 20D.

Typically, the package P1 will have been discharged from the conveyor and thus will have traveled past the module 20E before the expiration of the jam timer, and thus the product detect signal is never sent to the adjacent upstream module 20D. At this point, since module 20D is no longer receiving a product detect signal from the adjacent downstream module 20E, zone D becomes active through the module 20D outputting a drive signal, thus advancing package P2. This process continues upstream until the packages have been discharged from the conveyor.

In FIG. 13, the jam protection feature is demonstrated as it applies to the slug mode. Package P1 is shown as being jammed between zones C and D, and is being detected by module 20C. Upon detection of package P1, module 20C begins the jam timer (in addition to sending a product detect signal to the adjacent downstream module 20D). Since the package P1 is jammed, the timer will expire (time out) thus, causing the module 20C to send a product detect signal to the adjacent upstream module 20B. While the jam timer for module 20C was operating, packages P2 and P3 were driven into the jammed package P1. When module 20B receives the product detect signal from the adjacent downstream module 20C, it will generate a no drive signal to stop the zone (zone B). Module 20B which is detecting package P3 also sends a product detect signal to the adjacent upstream module 20A, bypassing the jam timer in module 20B. When the package P4 then is detected by the module 20A, a no drive signal is generated by the module 20A to stop the zone A from running. Once the jammed package P1 is dislodged or removed, the conveyor returns to the normal slug mode state.

Again, with the jam protection enabled while in the slug mode, if a package becomes jammed at any zone for a predetermined time period (e.g. 6 seconds) or longer, packages on the upstream side of the jammed package will stop in sequence until the jammed package is dislodged or removed. The zone containing the jammed package will continue to drive, in many cases dislodging the jammed package without outside help. The zones will return to normal operating mode once the jam is cleared.

Finally, with reference to FIG. 14, the use of a zone stop wired in the middle of the conveyor is illustrated. In this instance a switch has been connected to the appropriate terminals of the terminal block of module 20C in order to make module 20C a zone stop. By setting the zone stop input of module 20C to active, module 20C is set up to stop the package P1 when it enters zone C. Packages P2 and P3 stop in zones B and A in accordance with the sequence described with reference to FIG. 9.

In another embodiment, the present invention includes a conveyor loading system 32 that can include a loading timer 33, a wake up eye 34, a side sensor 31, a travel timer 36 and selected components of the control system of the conveyor 10, such as the sensors 28, the logic modules 20, the zone controllers 21 and the communication lines 42, as shown in FIGS. 16 through 20. Generally, the conveyor loading system is configured to stop movement of zones upstream from a loading zone for a period of time to allow the control system to distinguish a normal package and a placed package. The illustrated embodiments of the conveyor loading system 32 have the advantage of being fitted to existing conveyor control systems and sharing their components. However, it should be noted that the conveyor loading system 32, similar to the conveyor control system, may be implemented by varying combinations of hardware, software, firmware, etc., and still fall within the purview of the present invention.

Figure 19:
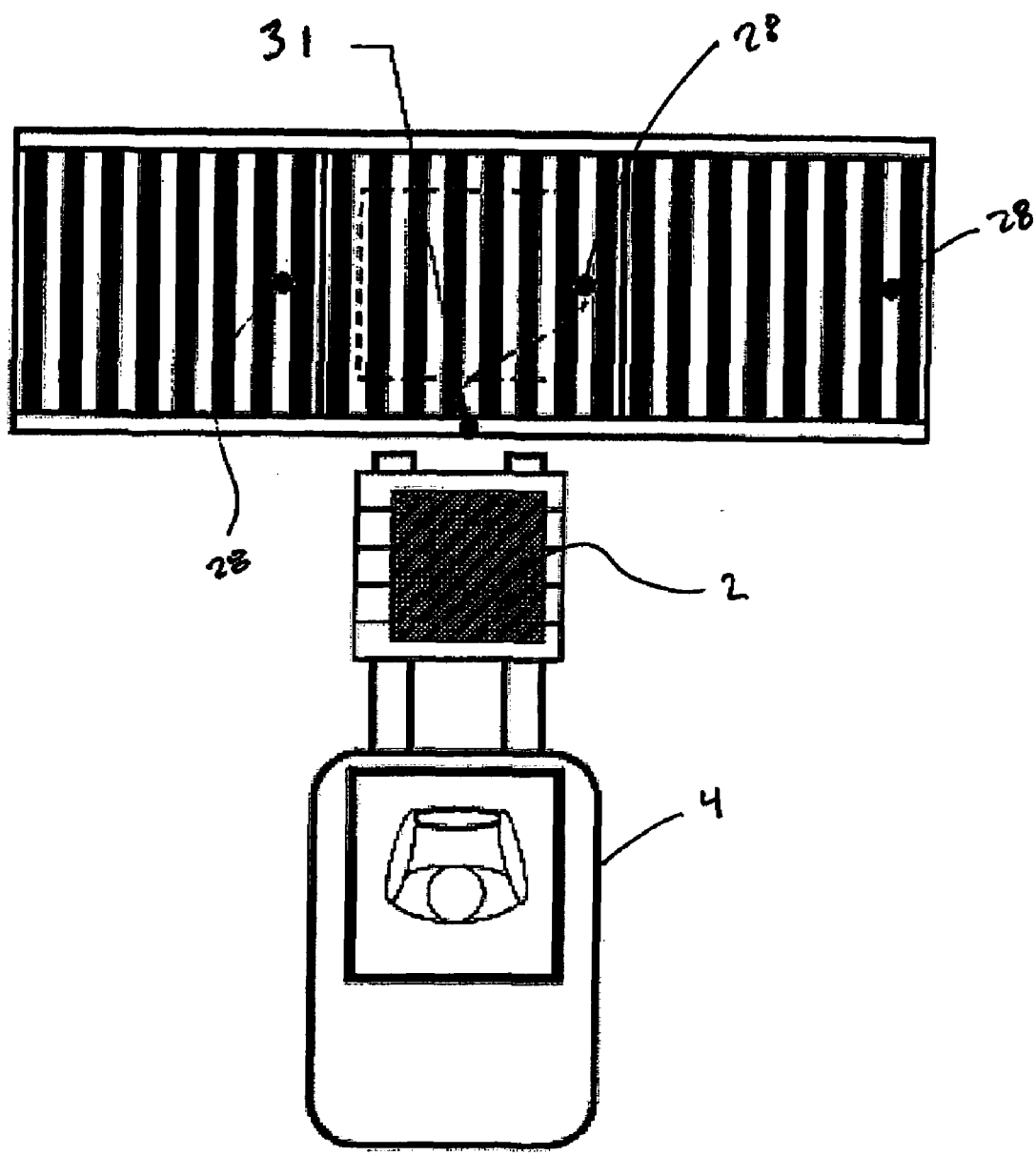
FIG. 19 is a schematic of the conveyor of FIG. 17 with a second, side sensor for sensing loading of an intermediate zone in another embodiment of the present invention.

The loading timer 33 is configured to activate when its logic module's sensor 28 is blocked by placement of a load into its respective zone on the conveyor 10, as shown in FIG. 19, for example. The logic modules 20 are configured to detect operation of the loading timer 33 and set its output to OFF in order to simulate a BLOCKED signal sent to the upstream logic module. This keeps the zone's conveying surfaces 12, 13 from running and conveying upstream packages into the zone in which the package or load is being placed.

The loading timer 33 is configured to remain activated even if the sensor 28 becomes clear. This allows for the temporary shifting of the package by the forklift 4 as the package or load is positioned during placement on the conveyor 10. Further, the loading timer 33 is preferably configured to reset itself if the sensor 28 is clear and then blocked again, ensuring that a full timer length is available for adjustment of the package location.

The loading timer 33 is further configured to not be invoked when a package blocks the module's sensor 28 while it is being transported normally along the conveyor 10. This avoids a disruption of product flow on the conveyor 10.

The travel timer 36 is configured to activate when the adjacent upstream zone sensor state changes from BLOCKED to CLEAR. Under normal operation conditions, this will occur as the package advances out of the upstream zone and into the loading zone. Generally, the travel timer should be set to expire after allowing enough time for the leading edge of the package to reach the loading zone's sensor 28.

The module 20 of the loading zone is configured to detect the status of the travel timer 36 before detecting the status of the loading timer 33. If the travel timer 36 is active, then the controller system will ignore the loading timer 33, essentially assuming that package being detected in the loading zone is being driven into the zone from upstream on the conveyor 10, and the module 20 therefore does not invoke the loading timer 33. Alternatively, if the travel timer 36 has not been activated, the module 20 is configured to assume that the package has been placed by the forklift 4.

Figure 17:
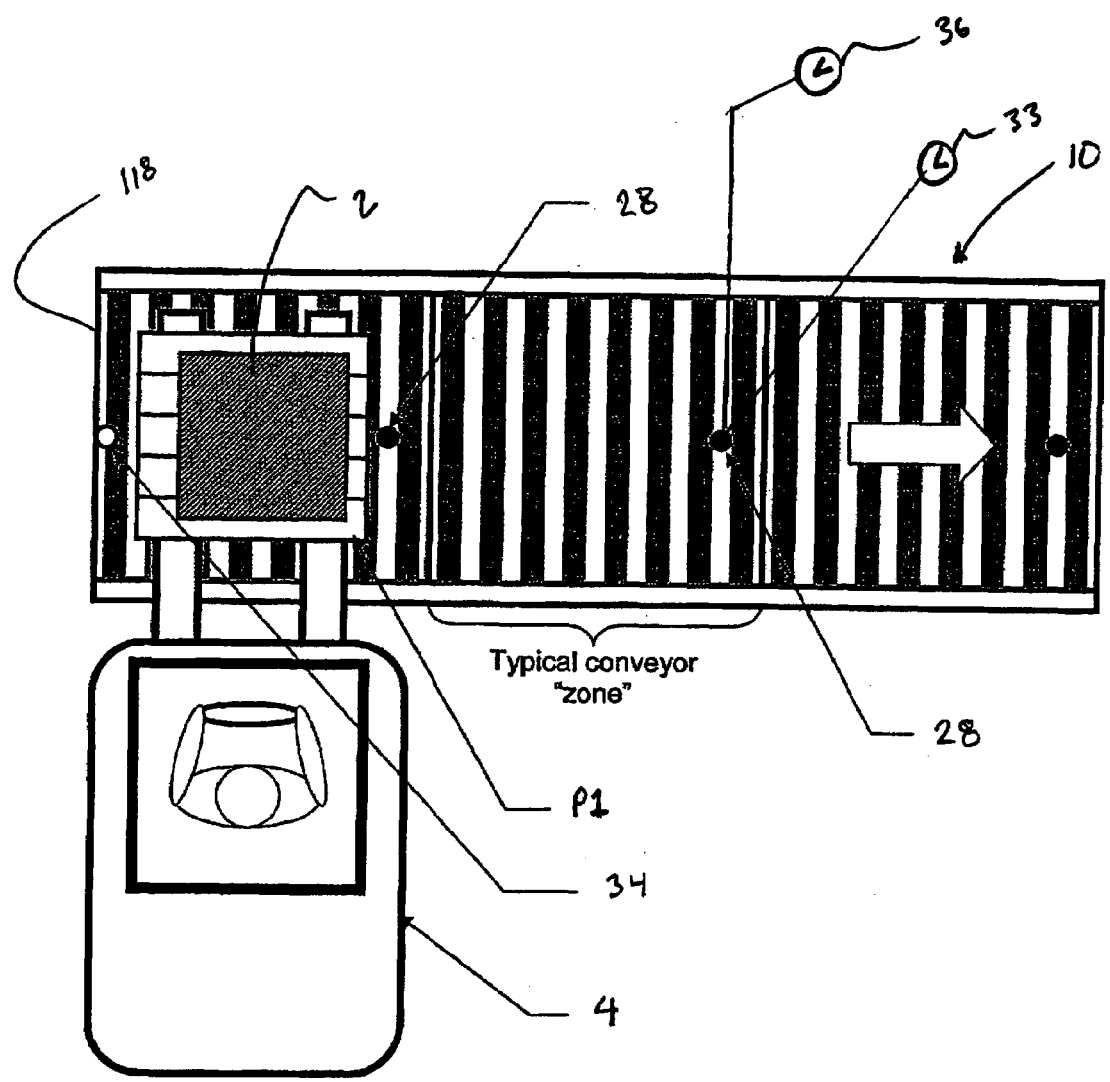
FIG. 17 is a schematic of loading of a conveyor of another embodiment of the present invention.

The wake up eye 34 of the conveyor loading system 32 is positioned at the infeed end 118 of the conveyor 10, as shown in FIG. 17. The use of the wake up eye 34 facilitates the module 20 putting the zone into sleep mode. The wake up eye 34 activates the zone to run when the package is conveyed into the infeed end 118, past the wake up eye. In one aspect, the wake up eye 34 may activate the travel timer 36 if it is flagged by the forklift 4, or other blockage. Therefore, when the conveyor 10 is typically loaded by the forklift 4, the wake up eye 34 may be remounted to avoid its being flagged.

If the wake up eye 34 is not present or not flagged, the travel timer 36 is inactive when the forklift 4 and/or package blocks the sensor 28. This invokes the loading timer 33 and the module 20's output is set to OFF for the duration of the timer, allowing positioning of the package or load.

Figure 18:
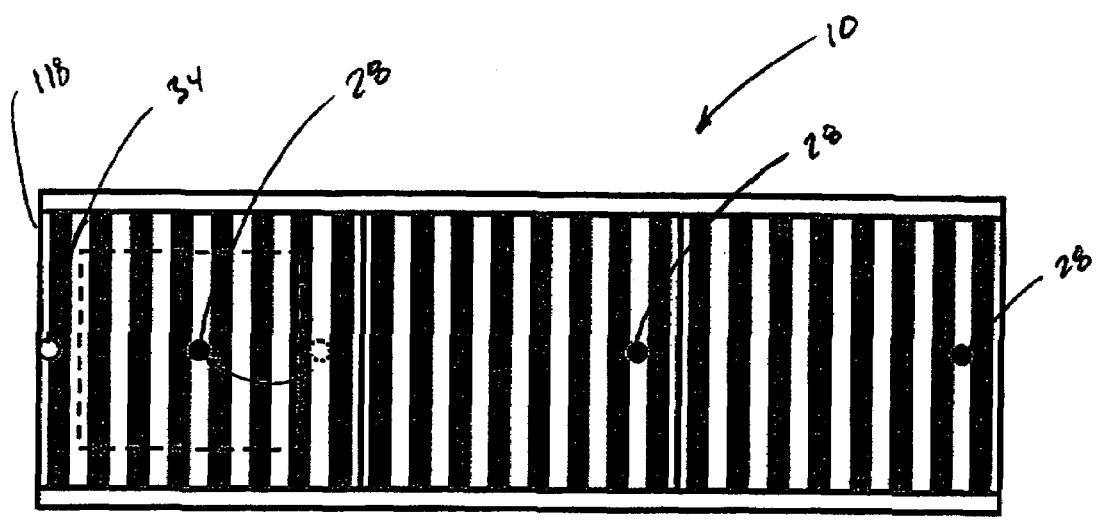
FIG. 18 is a schematic of the conveyor of FIG. 17 with an infeed zone having a load detection sensor repositioned to a middle of the zone in another embodiment of the present invention.

In yet another aspect, as shown in FIG. 18, the sensor 28 in the zone at the infeed end 118 may be placed at the middle of that zone to ensure that the package is detected during loading. This placement avoids the sensor 28 not being activated by the loading process which would either leave the package unmoving if the sleep mode is enabled, or result in the rollers 14 driving as the package is positioned.

In another aspect, a dual transducer may be used that includes one or more additional sensors, such as the side sensor 31, as shown in FIG. 19. The first sensor 28 in the zone is located near the discharge end of the zone. The side sensor 31 is located so as to detect the package as it is placed on the conveyor 10 by the forklift 4 or the forklift itself, but not after it is lowered into position or is being normally transported. For example, the side sensor 31 may be placed on the side rail of the conveyor 10. In this aspect, the module 20 is configured with the two sensors 28, 31 to operate in parallel or either/or mode. In this manner, the module 20 is configured to treat blockage of either of the two sensors 28, 31 as a sensor blocked message.

Figure 20:
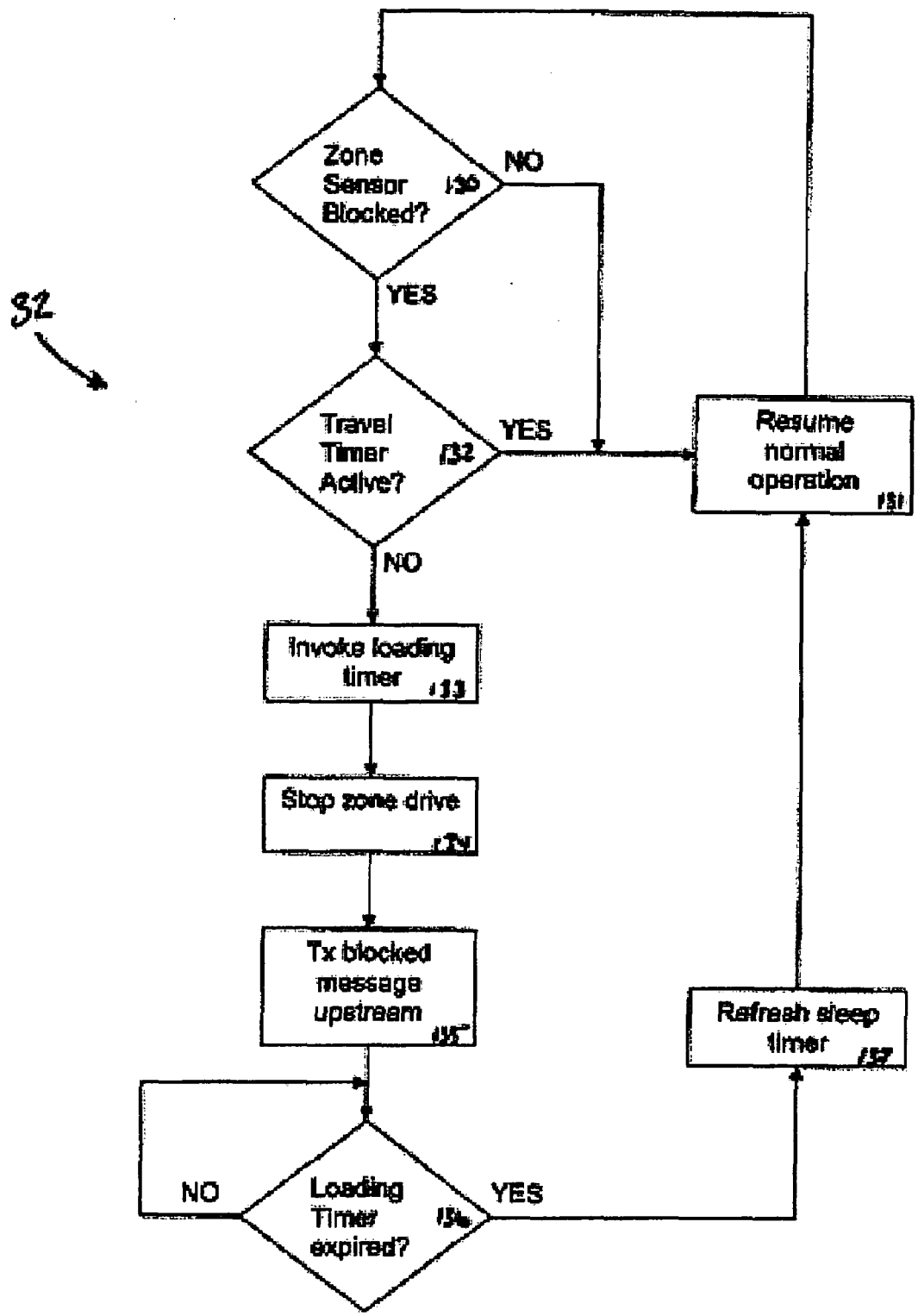
FIG. 20 is a control flow diagram showing activation of a loading and travel timers of yet another embodiment of the present invention.

The conveyor loading system 32 of the present invention includes logic illustrated by FIG. 20. In a step 130, the logic module 20 is configured to query the sensor 28 to determine if the sensor is blocked. If the sensor is not blocked ("NO"), the logic module 20 proceeds to a step 131 to resume normal operation. If the sensor is blocked ("YES"), the logic module 20 is configured to proceed to a step 132 and queries the travel timer 36 to see if it is active. If it is active ("YES"), the logic module 20 is configured to proceed to the resume normal operation step 131.

If the travel timer 36 is not active ("NO"), the logic module 20 proceeds to a step 133 and invokes the loading timer 33. The logic module 20, in a step 134, stops the zone drive with the drive controller 21. Also, the logic module transmits a blocked message upstream in a step 135, stopping the upstream zone. During stoppage, the logic module 20 is configured to continuously check, in a step 136, whether the loading timer 33 has expired (is no longer activated). If it has not expired ("NO"), the logic continues to execute step 136. If it has expired ("YES"), the logic refreshes a sleep timer in a step 137, thereby putting the conveyor 10 zone back into sleep mode.

The zone loading system 32 operates to distinguish zone loading from normal operation and controls the conveyor 10 accordingly. When loading at the zone at the infeed end 118, as shown in FIG. 17, is loaded with the package, the package blocks the sensor 28 of the module 20 controlling that zone. The module 20 then looks at the status of the travel timer 36. With respect to the infeed end 118, there is no upstream zone to invoke the travel timer 36, so the blockage of the sensor engages the loading timer 33, stopping the zone movement, and then the package is freely placed by the forklift 4. Loading of the zone at the infeed end 118 with additional confidence for blocking the sensor 28 is shown in FIG. 18, wherein the sensor is positioned near a middle point of the zone.

Loading at an intermediate zone is illustrated in FIG. 19. The forklift 4 places a package P2 in the intermediate zone, blocking the sensor 28 or the side sensor 31 of the module 20 controlling the zone. The subject module 20 then looks at the status of the travel timer 36. If the travel timer is inactive, i.e., package P1 has not yet been conveyed into the sensor 28 of the upstream zone, the subject zone module's output state is set to OFF for the duration of the timer. This sends a sensor BLOCKED message to the upstream conveyor, allowing the forklift 4 to set the package or load down without the upstream zone conveying its package P1 into the subject zone.

The present invention has many advantages. For example, the use of the loading timer 33 enables a delay that allows loading of packages into zones on the conveyor system 10. The use of additional sensors, such as the side sensor 31 in an intermediate loading zone, or a repositioned sensor 28 at the infeed end 118, facilitates detection of loading and triggering of the loading timer 33. Use of the travel timer 36, on the other hand, ensures that normally traveling packages are not interrupted by normal package tracking triggering of the loading timer 33. Overall, the conveyor loading system 32 allows the conveyor 10 to detect loading of packages and to halt the zone in which loading is occurring, and to stop downstream movement of packages upstream to avoid a collision during loading.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor system for conveying a plurality of loads, said conveyor system comprising:
    a conveying surface configured to convey the loads in at least a downstream direction, said conveying surface divided into a plurality of zones;
    a loading sensor associated with at least one of the plurality of zones and configured to detect placement of one of the loads into the zone;
    a loading timer configured to be activated by the loading sensor detecting placement of the load into the zone and to remain activated for a predetermined time thereafter; and
    a controller system configured to control movement of each of the zones of the conveyor surface independently of other zones, said controller system configured to halt movement of the zone in response to the loading timer being activated.

2. A conveyor system for conveying a plurality of loads, said conveyor system comprising:
    a conveying surface configured to convey the loads in at least a downstream direction, said conveying surface divided into a plurality of zones;
    a loading sensor associated with at least one of the plurality of zones and configured to detect placement of one of the loads into the zone;
    a loading timer configured to be activated by the loading sensor detecting placement of the load into the zone and to remain activated for a predetermined time thereafter;
    a controller system configured to control movement of each of the zones of the conveyor surface independently of other zones, said controller system configured to halt movement of the zone in response to the loading timer being activated; and
    a travel timer configured to be activated by movement of one of the loads in an upstream one of the zones and to remain activated for a second predetermined time thereafter,
wherein said controller system is configured to deactivate the loading timer while the travel timer is activated.

3. A conveyor system of claim 2, wherein the loading sensor is further configured to detect movement of the load along the conveying surface into the zone and wherein said controller is configured to cause the conveying surface to continue conveying the load detected moving along the conveying surface while the travel timer is activated if a downstream adjacent zone is open.

4. A conveyor system of claim 1, wherein the loading timer is configured to restart after the loading timer is no longer activated.

5. A conveyor system of claim 1, wherein the controller system is further configured to halt movement of an upstream one of the zones in response to the loading timer being activated.

6. A conveyor system of claim 1, wherein the loading sensor is positioned between an upstream and downstream ends of the zone.

7. A conveyor system of claim 1, wherein the loading sensor is positioned at a downstream end of the zone.

8. A conveyor system of claim 1, further comprising a second loading sensor configured to detect placement of the load in the zone.

9. A conveyor system for conveying a plurality of loads, said conveyor system comprising:
   a conveying surface configured to convey the loads in at least a downstream direction, said conveying surface divided into a plurality of zones;
   a first loading sensor associated with at least one of the plurality of zones and configured to detect placement of one of the loads into the zone;
   a loading timer configured to be activated by the loading sensor detecting placement of the load into the zone and to remain activated for a predetermined time thereafter;
   a controller system configured to control movement of each of the zones of the conveyor surface independently of other zones, said controller system configured to halt movement of the zone in response to the loading timer being activated; and
   a second loading sensor configured to detect placement of the load in the zone, wherein the first loading sensor is positioned near a downstream end of the zone and the second loading sensor is positioned near an edge of the zone.

10. A sensing module for controlling the application of a drive force to a respective accumulating zone of an accumulation conveyor, the sensing module comprising:
    a body;
    logic circuitry at least partially within said body;
    a sensor coupled to said logic circuitry, said sensor providing an product sensed signal to said logic circuitry when a product is within its respective accumulating zone;
    control connections in communication with said logic circuitry and including an upstream product detect signal input adapted to receive a product detect signal downstream output from an upstream sensing module relative to product flow, a downstream product detect signal input adapted to receive a product detect signal upstream output from a downstream sensing module relative to product flow, a product detect signal upstream output adapted to transmit a product detect signal to an upstream module, a product detect signal downstream output adapted to transmit a product detect signal to a downstream module, and a drive/no-drive force selection output in communication with the drive force that selectively enables and disables the drive force for the respective accumulating zone; and
    a loading timer configured to be active for a predetermined period of time after activation;
    wherein said logic circuitry is configured to activate the loading timer in response to the product sensed signal and to communicate the no-drive force election output during the predetermined period of time.

11. A sensing module of claim 10, wherein the logic circuitry is further configured to communicate the product detect signal to the product detect signal upstream output during the predetermined period of time.

12. A sensing module of claim 11, further comprising a travel timer configured to be active for a second predetermined period of time after activation, wherein the logic circuitry is configured to activate the travel timer in response to the product detect downstream output from the upstream product detect signal input and to inhibit activation of the loading timer during the second predetermined period of time.

13. A sensing module of claim 12, wherein the sensor is configured for positioning at a downstream end of the zone.

14. A sensing module of claim 13, wherein the sensor is further configured for positioning between an upstream and downstream ends of the zone.

15. A sensing module of claim 14, further comprising a second sensor coupled to said logic circuitry, said second sensor providing the product sensed signal to said logic circuitry when blocked by loading of the product.

16. A sensing module of claim 15, wherein the second sensor is configured for positioning at a side of the zone.

17. A sensing module of claim 10, further comprising a wake up sensor positioned near an infeed end of the zone and configured to communicate an infeed product detect signal to the logic circuitry, said logic circuitry configured to transmit the drive signal in response to the infeed product detect signal unless within the predetermined period of time after activation of the loading sensor.

18. A sensing module of claim 10, wherein the logic circuitry is configured to restart the predetermined period of time in response to the product sensed signal.

19. A method of conveying a plurality of loads, said method comprising:
    sensing placement of a load in one of a plurality of zones dividing a conveying surface;
    activating a loading timer for a predetermined period of time in response to detection of placement of the load; and
    halting movement of the load in the zone during the period of time while the loading timer is activated.

20. A method of conveying a plurality of loads, said method comprising:
    sensing placement of a load in one of a plurality of zones dividing a conveying surface;
    activating a loading timer for a predetermined period of time in response to detection of placement of the load;
    halting movement of the load in the zone during the period of time while the loading timer is activated;
    detecting movement of an upstream one of the loads in an upstream one of the zones toward the zone before activating the loading timer;
    activating a travel timer for a second predetermined period of time in response to detecting movement of the upstream load in the upstream zone;
    deactivating the loading timer during the second predetermined period of time;
    sensing the upstream load moving into the zone; and
    conveying the upstream load in the zone during the second predetermined period of time.

21. A method of claim 20, further comprising again sensing placement of the load and restarting the loading timer.

22. A method of claim 21, further comprising halting movement of an upstream one of the zones in response to the loading timer being activated.

* * * * *